US011938651B2

(12) United States Patent
Brunner

(10) Patent No.: US 11,938,651 B2
(45) Date of Patent: Mar. 26, 2024

(54) CONCRETE TUBE AND FORMWORK DEVICE AND METHOD FOR PRODUCING SUCH A CONCRETE TUBE

(71) Applicant: PERI SE, Weissenhorn (DE)

(72) Inventor: Werner Brunner, Buch (DE)

(73) Assignee: PERI SE, Weissenhorn (DE)

( * ) Notice: Subject to any disclaimer, the term of this patent is extended or adjusted under 35 U.S.C. 154(b) by 567 days.

(21) Appl. No.: 16/492,605

(22) PCT Filed: Mar. 2, 2018

(86) PCT No.: PCT/EP2018/055129
§ 371 (c)(1),
(2) Date: Sep. 9, 2019

(87) PCT Pub. No.: WO2018/162332
PCT Pub. Date: Sep. 13, 2018

(65) Prior Publication Data

US 2021/0138687 A1 May 13, 2021

(30) Foreign Application Priority Data

Mar. 8, 2017 (DE) ..................... 10 2017 203 772.5

(51) Int. Cl.
*B28B 21/06* (2006.01)
*B61B 13/10* (2006.01)
*E04G 11/34* (2006.01)

(52) U.S. Cl.
CPC .............. *B28B 21/06* (2013.01); *B61B 13/10* (2013.01); *E04G 11/34* (2013.01)

(58) Field of Classification Search
CPC .......... B28B 21/06; E04G 11/34; B61B 13/10
See application file for complete search history.

(56) References Cited

U.S. PATENT DOCUMENTS 3,551,537 A * 12/1970 Thomason .............. F16L 1/038 249/11
2011/0041942 A1* 2/2011 Bartlechner ........ F16L 25/0018 264/278

FOREIGN PATENT DOCUMENTS

DE 954407 12/1956
DE 1784718 11/1971
(Continued)

OTHER PUBLICATIONS

Holst, Karl Heinz: Brücken aus Stahlbeton und Spannbeton—Entwurf, Konstruktion und Berechnung. 2., überarb. und erw. Aufl Berlin : Ernst, Verl. für Architektur und techn. Wiss., Titelseite + Inhaltsverzeichnis + S. 419-424.—ISBN 3-433-01178-8.

*Primary Examiner* — Alison L Hindenlang
*Assistant Examiner* — Virak Nguon
(74) *Attorney, Agent, or Firm* — SLEMAN & LUND LLP

(57) ABSTRACT

A method for producing a concrete tube for a hyperloop passenger transport system. The concrete tube is concreted in situ by means of a formwork device. The formwork device has a formwork carriage which moves forwards during concreting. The formwork carriage has an inner form and an outer form for shuttering the concrete tube. An interspace between the inner form and outer form is filled, in particular continuously, with concrete. The solidified concrete tube can be supported on pillars via bearings. The freshly solidified portion of the concrete tube is preferably supported on the inside by inner rollers and on the outside by outer rollers. In order to support the formwork carriage on the pillars, the formwork device can have supporting rollers. The formwork device for implementing the method and to the concrete tube produced by the method for the hyperloop passenger transport system.

19 Claims, 5 Drawing Sheets

(56) References Cited

FOREIGN PATENT DOCUMENTS

| | | | | | |
|---|---|---|---|---|---|
| DE | 2127156 | | | 12/1972 | |
| DE | 4015203 | A1 | | 11/1990 | |
| DE | 4123594 | A1 | | 1/1993 | |
| EP | 0500221 | | | 8/1992 | |
| EP | 500221 | A1 | * | 8/1992 | ........... E01D 21/065 |
| EP | 1457601 | | | 9/2004 | |
| EP | 1457601 | B1 | * | 11/2005 | ........... E01D 21/105 |
| EP | 2242628 | | | 10/2010 | |
| WO | WO1981002032 | A1 | * | 7/1982 | |

* cited by examiner

CONCRETE TUBE AND FORMWORK DEVICE AND METHOD FOR PRODUCING SUCH A CONCRETE TUBE

FIELD OF THE INVENTION

The invention relates to a formwork device for producing a concrete tube. The invention also relates to a method for producing such a concrete tube and to the concrete tube itself.

BACKGROUND OF THE INVENTION

The production of horizontally installed concrete tubes is known. For example, EP 2 242 628 B1 discloses a method for producing concrete tubes for sewers. The known concrete tubes have an expendable inner plastics tube and are manufactured in a trough. Once the concrete tube has set, it is removed from the trough and said trough is used again as a mold.

Furthermore, DE 1 784 718 C discloses a device for producing concrete tubes. The known device uses a roller-compacting method for this purpose.

It is also known to produce concrete tubes using what is known as a spun-concrete method. In this method, concrete is centrifuged against a mold of a formwork device by means of a rotating roller.

Attempts are currently being made to construct a new kind of passenger transport system in which a passenger transport means, in particular in the form of a train, is accommodated in an at least partially evacuated tube. This passenger transport means is known by the name "hyperloop." At a top speed of over 1000 km/h, this passenger transport means is intended to replace long-distance trains and short-haul flights in a particularly energy-efficient manner.

One problem with this passenger transport system is, inter alia, the high construction costs for the tubes. Steel tubes suitable for accommodating an above-mentioned passenger transport means cost approximately EUR 15,000 per running meter of tube.

SUMMARY OF THE INVENTION

The problem addressed by the present invention is therefore to provide a tube suitable for accommodating a passenger transport means as described at the outset that can be produced significantly more cost-effectively.

This problem is solved by a formwork device and a concrete tube. The dependent claims set out expedient developments.

The problem according to the invention is thus solved by a formwork device for producing a horizontal concrete tube using a cast-in-place concrete construction.

According to the invention, "horizontal" is understood to mean substantially horizontal, i.e. horizontal ±10°, in particular horizontal ±5°.

Furthermore, a "cast-in-place concrete construction" is understood to mean setting the concrete on site, with the concrete structure obtained after it sets not needing to be transported any further.

The formwork device comprises a formwork carriage which can be moved forward during production of the concrete tube, in particular steadily. In the process, the concrete tube is produced by concrete being introduced into a space delimited by an inner mold, an outer mold, and an end element. The formwork device is open at the end opposite the end element, such that the newly produced concrete tube remains stationary, while the formwork carriage is moved further forward and the concrete tube continuously lengthens in the process. The formwork carriage can be moved on spaced-apart columns, on which the concrete tube will later be supported. The concrete is introduced into the space through a filling connection.

The filling connection is preferably arranged such that the space can be filled from above. Particularly preferably, the filling connection comprises a filling funnel.

The space can be filled via a plurality of filling connections or preferably via a single filling connection.

In a preferred embodiment of the formwork device, it comprises a vibrator. The vibrator is preferably arranged in the region of the filling connection.

Alternatively or additionally, the formwork device may comprise an agitator for homogeneously filling the space with concrete.

A critical parameter when pouring the concrete for the tubes is the concrete setting as the formwork carriage slides along horizontally. This is because the concrete sets at a certain distance from the filling connection.

If the concrete is introduced into the space from above, for example, the solidification front of the concrete in the upper region of the tube is horizontally further from the filling connection than in the lower region of the concrete tube: The lower part of the concrete tube is then already solidified, while the upper part is still soft and deformable. In order to make it possible to compensate for the differing progress of the solidification front in the horizontally upper and lower parts at least in part, the end element is preferably oriented at an acute angle relative to the horizontal. The acute angle is in particular between 47° and 67°, preferably between 52° and 62°.

The end element is preferably planar.

In order to make it possible to adjust the difference in distance between the solidification fronts, the angle of the end element relative to the horizontal can be adjusted to a limited extent.

The inner mold is preferably designed for producing the concrete tube with a minimum clear width of greater than 3 m, in particular of greater than 3.5 m.

The inner mold and the outer mold are preferably designed for producing the concrete tube with a thickness of less than 20 cm, in particular of less than 15 cm.

The concrete tube that can be produced by the formwork device can have a polygonal cross section, for example a square cross section. In order to maximize the stability of a concrete tube of this type, however, it preferably has an oval or circular inner circumference and an oval or circular outer circumference. In order to produce a concrete tube of this type, the inner mold preferably has a cylindrical lateral outer surface, in particular a circular lateral outer surface, and the outer mold has a cylindrical lateral inner surface, in particular a circular lateral inner surface.

The concrete tube is intended to be manufactured as precisely as possible. For example, the diameter accuracy of the concrete tube should only deviate from the desired diameter by a few millimeters. In order to achieve this, the formwork carriage preferably has an inner supporting structure to which the inner mold is fastened and has an outer supporting structure to which the outer mold is fastened. The inner supporting structure and the outer supporting structure are preferably rigidly interconnected, in particular fixedly and immovably interconnected.

The inner supporting structure and/or the outer supporting structure may comprise a truss assembly. The truss assembly preferably comprises a plurality of steel struts.

More preferably, the outer supporting structure is arranged to be leading relative to the inner supporting structure. In this case, the outer supporting structure preferably extends by at least one column distance in front of the filling connection.

In a particularly preferred embodiment of the invention, the inner supporting structure comprises an inner roller that can be supported on the inside of the concrete tube produced using the formwork device. The inner roller may be conical or spherical. Alternatively or additionally, the outer supporting structure may comprise an outer roller that can be supported on the outside of the concrete tube. As a result, the weight of the concrete tube can be reliably supported during the production process without the concrete tube deforming. Preferably, the formwork device comprises a plurality of inner rollers and/or outer rollers for supporting the concrete tube.

The formwork device may comprise a support roller, by means of which the formwork carriage can be supported on one of the columns. The support roller may be rotatably arranged on the column or formwork carriage. The support is preferably provided by a shoulder of the column. Preferably, a plurality of support rollers are provided for supporting the weight of the formwork carriage.

The inner roller, outer roller and/or support roller may have an external diameter of between 50 mm and 150 mm, in particular between 70 mm and 130 mm, preferably between 90 mm and 110 mm.

The formwork device may comprise an outer support for supporting the outer mold. The outer support may be movable, in particular pivotable, in order to be able to pass by one of the columns when the formwork carriage is moved. Here, the formwork device may be designed to hydraulically pivot the outer support.

Alternatively or additionally, the formwork device may comprise a concrete tube support which supports the weight of the concrete tube produced after it has set. The concrete tube support may be movable, in particular hydraulically, and in particular may be pivotable, in order to be able to pass by one of the columns.

The formwork device may comprise a drive for moving the formwork carriage forward when producing the concrete tube. The drive in particular comprises an advancing hydraulic cylinder. The drive preferably comprises a plurality of advancing hydraulic cylinders. In this case, the drive is more preferably designed for continuously moving the formwork carriage forward.

In order to make it easier to slide the inner mold on the concrete tube, the formwork device may comprise a film between the concrete tube and the inner mold. Alternatively or additionally, the formwork device may comprise a film between the concrete tube and the outer mold in order to make it easier to slide the outer mold on the concrete tube. The film between the concrete tube and the inner mold may be inserted through a slot in the formwork device. Alternatively or additionally, the film between the concrete tube and the outer mold may be inserted through a slot in the formwork device.

The formwork device may be designed to pivot, in particular rotate, the inner mold about the longitudinal axis of the inner mold. Alternatively or additionally, the formwork device may be designed to pivot, in particular rotate, the outer mold about the longitudinal axis of the outer mold. As a result, the concrete tube is prevented from adhering to the inner mold and outer mold. Particularly preferably, the inner mold and the outer mold are pivotable, in particular rotatable, in opposite directions in this case.

The formwork device may comprise at least one lubricating groove, in particular a plurality of lubricating grooves, in order to make it possible to introduce a lubricant between the concrete tube and the inner mold and/or the outer mold. As a result, the concrete tube is particularly effectively prevented from adhering, in particular in connection with the pivotable inner mold or outer mold.

The problem according to the invention is thus further solved by a method for producing a horizontal concrete tube using a cast-in-place concrete construction in which concrete is introduced into the space in the above-described formwork device in order to form the concrete tube.

The formwork carriage is moved forward to produce the concrete tube, in particular at the same time as the space is being filled with concrete.

The formwork carriage is constantly, preferably continuously, moved horizontally forward by more than 20 m, in particular by more than 100 m, preferably by more than 1000 m, when pouring a concrete tube portion.

The advancing speed is preferably between 2 cm/min and 6 cm/min, in particular between 3 cm/min and 5 cm/min. As a result, a good compromise is reached between the quality of the concrete tube and a high production speed.

The problem addressed by the invention is further solved by a concrete tube using a cast-in-place concrete construction for accommodating a passenger transport means, wherein the longitudinal axis of the concrete tube extends horizontally, and the concrete tube has a seam-free length of greater than 20 m, in particular of greater than 200 m, and a minimum clear width of greater than 3 m. The concrete tube has preferably been produced using the previously described method.

The concrete tube preferably comprises ultra-high performance concrete (UHPC) having a tensile strength of greater than 150 N/mm2. The concrete tube may comprise between 0.5% and 2% steel fibers. The concrete tube preferably has a preload force imparted by a plurality of stranded wires that are each over 100 kN.

All measurements stated relate to a uniform central portion of the concrete tube, and not to the very first piece or the very end piece of the concrete tube.

Further features and advantages of the invention will become apparent from the following detailed description of an embodiment of the invention, from the claims and with reference to the figures of the drawings, which show details essential to the invention. The different features can be implemented in variants of the invention either individually or in any combination. The features shown in the drawings are set out such that the special features according to the invention can be made clearly visible.

DETAILED DESCRIPTION

Figure 1:
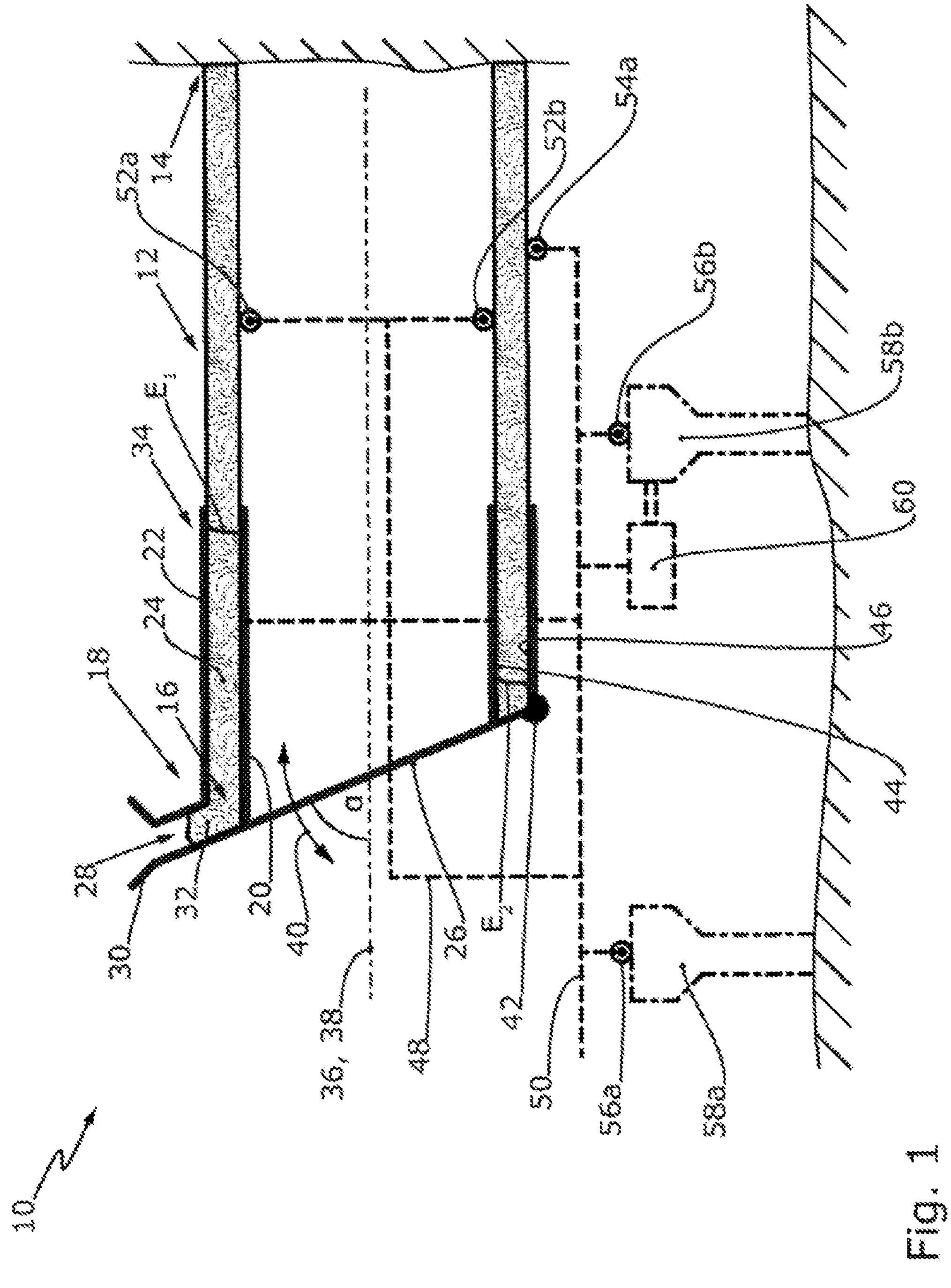
FIG. 1 is a schematic sectional view of a part of a formwork device when a concrete tube is being produced.

FIG. 1 shows a formwork device 10 for producing a concrete tube 12 from cast-in-place concrete. The concrete tube 12 has a fixed end 14 and a free end 16. The free end 16 is extended by formwork 18.

The formwork 18 has an inner mold 20 and an outer mold 22. The inner mold 20 and the outer mold 22 define a space 24. The space 24 is closed at the free end 16 by an end element 26. The formwork 18 comprises, above the outer mold 22, a filling connection 28, in this case comprising a filling funnel 30.

Concrete 32 is poured into the filling connection 28 and spreads out within the space 24. At the same time, a formwork carriage 34, which comprises the formwork 18, is moved away from the fixed end 14. As a result, the set part of the concrete tube 12 is pulled out of the space 24 and the concrete tube 12 is extended in the space 24 by freshly setting concrete 32.

The formwork carriage 34 has a longitudinal axis 36 that extends in the horizontal 38. Preferably, the longitudinal axis 36 of the formwork carriage 34 is congruent with the longitudinal axis of the concrete tube 12 or extends in parallel with the longitudinal axis of concrete tube 12. When pouring concrete, the formwork carriage 34 is moved substantially in the direction of the extended longitudinal axis 36. In this case, bends in the concrete tube produced have a minimum radius of greater than 10,000 m, in particular of greater than 15,000 m, preferably of greater than 20,000 m.

The inner mold 20 and the outer mold 22 are set back in parallel with the longitudinal axis 36 on the lower side of the formwork 18 opposite the upper side of the formwork 18. The in particular planar end element 26 has an angle of $0° < \alpha < 90°$ to the horizontal 38. As a result, the difference in distance between the filling connection 28 and the solidification front in the upper part of the space 24 or the lower part of the space 24 can be compensated for at least in part. In FIG. 1, for illustration, the upper and lower solidification fronts are indicated by the signs $E_1$ and $E_2$. In order to make it possible to more effectively control the difference between the solidification fronts $E_1$, $E_2$ in the upper part of the concrete tube 12 and the lower part of the concrete tube 12, the angle $\alpha$ of the end element 26 relative to the horizontal 38 can be adjusted, as shown in FIG. 1 by a double-headed arrow 40. To do this, the end element 26 may for example comprise a joint 42 at the lower end.

The inner mold 20 has a cylindrical lateral outer surface 44 and the outer mold 22 has a cylindrical lateral inner surface 46. The concrete tube 12 produced therefore has an annular cross section.

The inner mold 20 is attached to an inner supporting structure 48, and the outer mold 22 is attached to an outer supporting structure 50. For reasons of clarity, the inner supporting structure 48 and the outer supporting structure 50 are dashed. The inner supporting structure 48 supports the freshly produced concrete tube 12 on the inside by means of inner rollers, of which the inner rollers 52*a*, 52*b* are shown in FIG. 1 for reasons of clarity. The outer supporting structure 50 supports the freshly produced concrete tube 12 on the outside by means of outer rollers, of which the outer roller 54*a* is shown in FIG. 1 for reasons of clarity.

The inner supporting structure 48 and the outer supporting structure 50 are supported in the downward direction by support rollers, of which the support rollers 56*a*, 56*b* are shown in FIG. 1 resting on columns 58*a*, 58*b*. The columns 58*a*, 58*b* are preferably cast in concrete and are shown FIG. 1 by dashed lines and significantly reduced in size for reasons of clarity.

At least one stranded wire for preloading the concrete tube 12 may be arranged at the fixed end of the concrete tube 12.

FIG. 1 shows, by way of example, a drive 60, which is in the form of an advancing hydraulic cylinder that makes it possible to move the formwork carriage 34 forward.

Figure 2A:
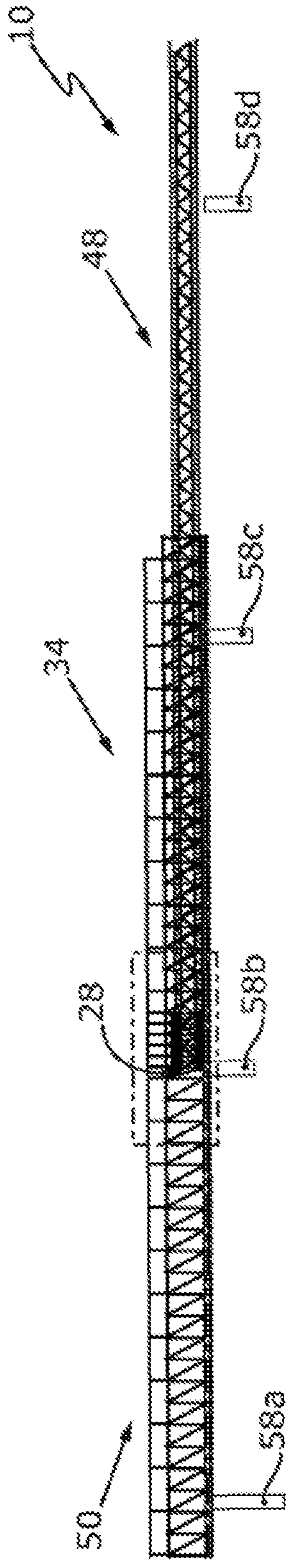
FIG. 2*a* is a complete side view of the formwork device from FIG. 1.

FIG. 2*a* is a side view of the formwork device 10. In this figure, the formwork carriage 34 extends over four columns 58*a*, 58*b*, 58*c*, 58*d*. The columns 58*a-d* are between 5 m and 30 m tall, and spaced apart by between 10 m and 60 m, in particular between 30 m and 60 m. The inner supporting structure 48 and outer supporting structure 50 each extend over a length of greater than 50 m. The inner supporting structure 48 trails by greater than 60% relative to a filling connection 28.

The outer supporting structure 50 leads by greater than 20%, in particular greater than 30%, relative to the filling connection 28.

Figure 2B:
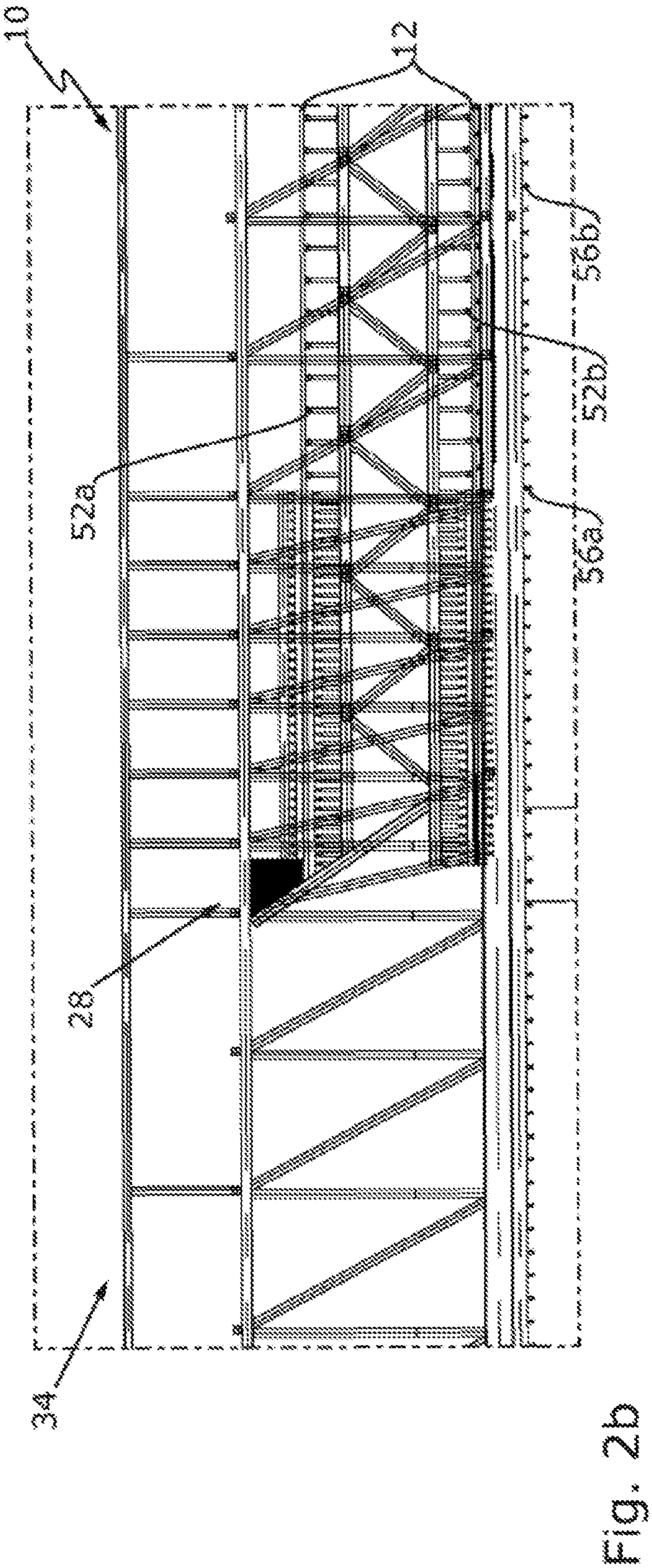
FIG. 2*b* is an enlarged partial view of the dashed region of the formwork device from FIG. 2*a;*

FIG. 2*b* shows a detail of the formwork device 10 from FIG. 2*a* in the region of the filling connection 28. The upper cross section and the lower cross section of the concrete tube 12 can be seen in FIG. 2*b*. The concrete tube 12 is supported from the inside by inner rollers, of which only the inner rollers 52*a*, 52*b* are provided with a reference sign in FIG. 2*b* for reasons of clarity. A plurality of support rollers for supporting the formwork carriage 34 are also visible in FIG. 2*b*, of which only the support rollers 56*a*, 56*b* are provided with a reference sign in FIG. 2*b* for reasons of clarity.

Figure 2C:
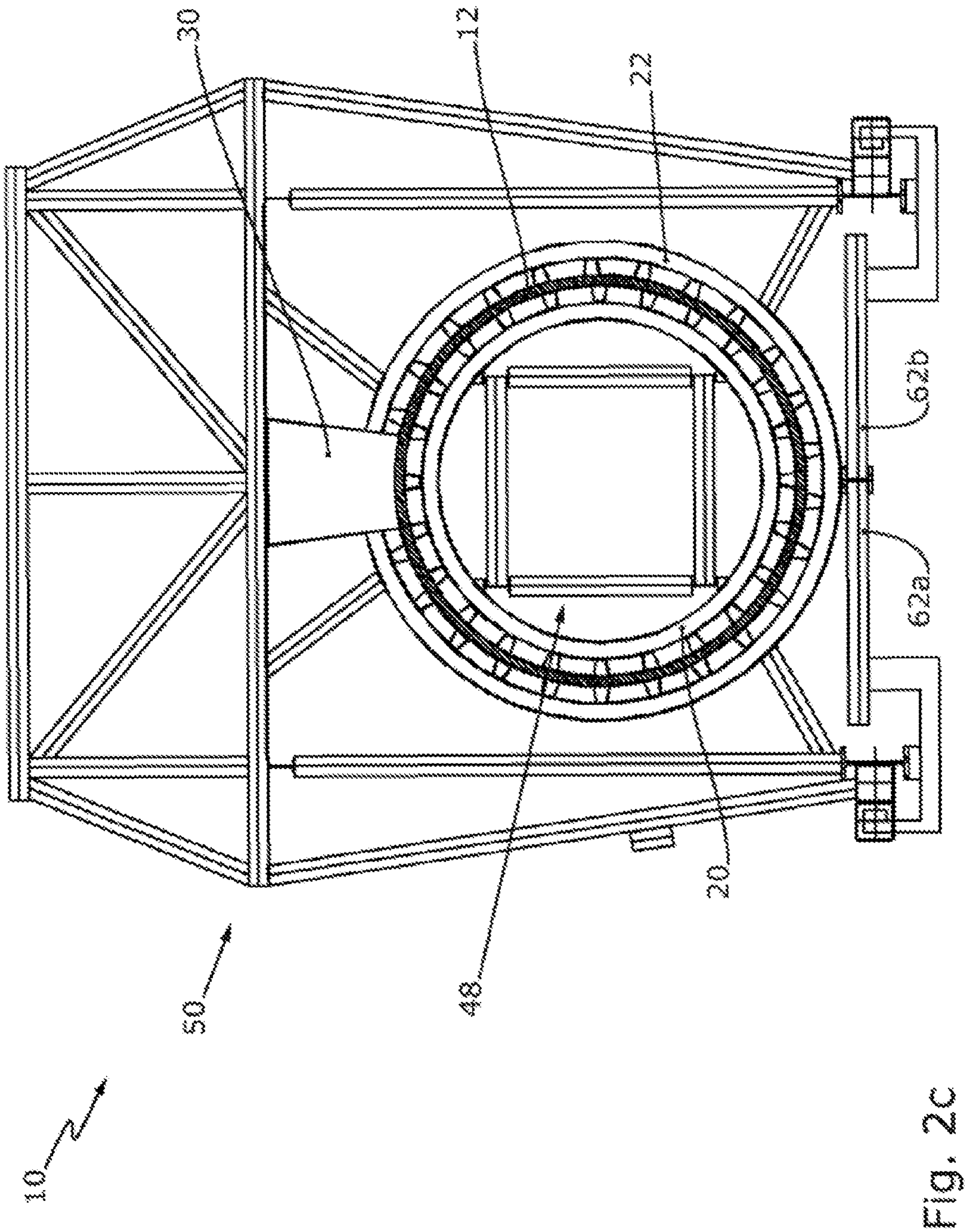
FIG. 2*c* is a partial sectional view of the end face (from the left) of the formwork device from FIG. 2*a;*

FIG. 2*c* is a partial sectional end view of the formwork device 10 together with the inner supporting structure 48, the outer supporting structure 50 and the filling funnel 30. The inner supporting structure 48 supports the inner mold 20 and the outer supporting structure 50 supports the outer mold 22. The concrete tube 12 is visible between the inner mold 20 and the outer mold 22. From considering FIGS. 2*a*, 2*b* and 2*c* together, it can be seen that both the inner supporting structure 48 and the outer supporting structure 50 comprise a truss assembly. This ensures high stability of the formwork device 10 with a relatively low weight.

The outer supporting structure 50 may comprise at least one outer support, in this case a plurality of outer supports 62*a*, 62*b*, for supporting the outer mold 22.

Figure 2E:
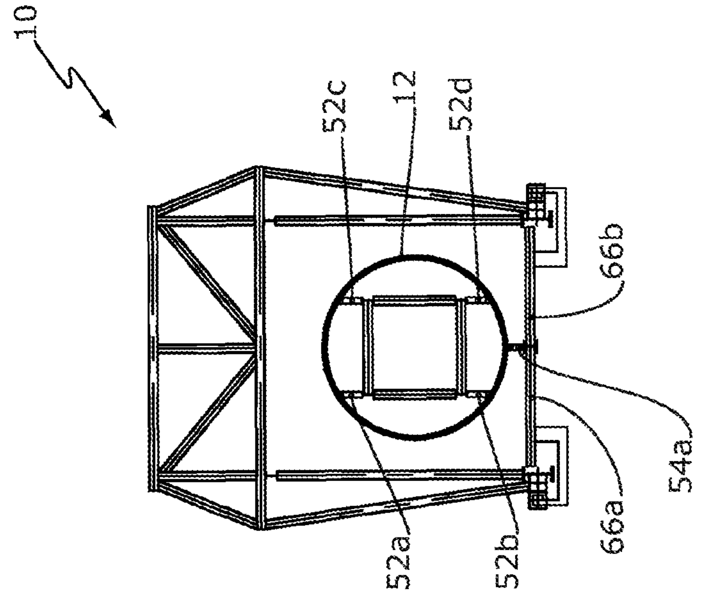
FIG. 2*e* is a partial sectional view of the end face of a part of the formwork device, with the part of the formwork device supporting the finished concrete tube.
Figure 2D:
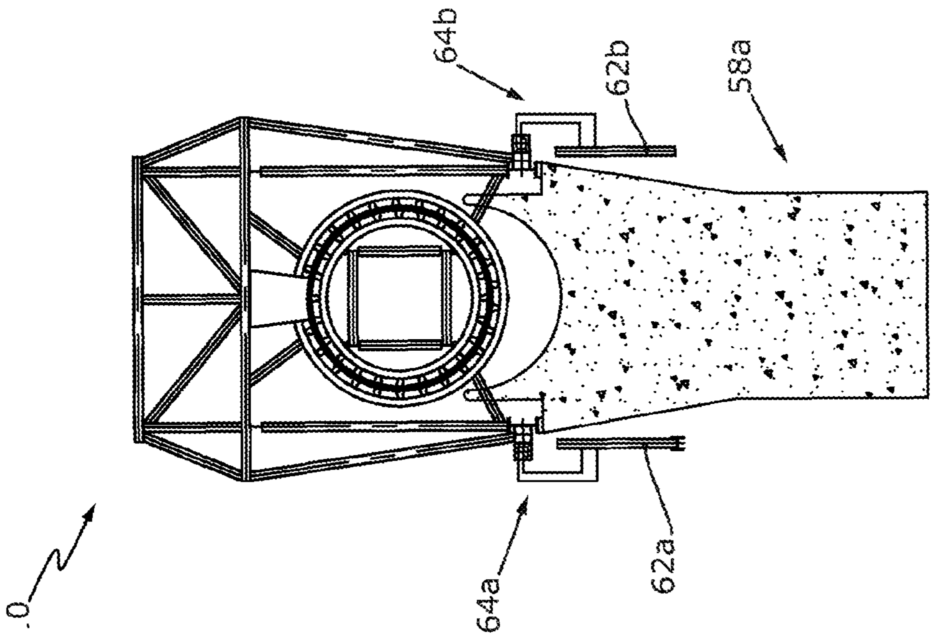
FIG. 2*d* is a view of the end face of the formwork device according to FIG. 2*c*, with the part of the formwork device for introducing the concrete being positioned in the region of a column.

FIG. 2*d* shows the formwork device 10 according to FIG. 2*c* in the region of a column 58*a*. As can be seen from considering FIGS. 2*c* and 2*d* together, the outer supports 62*a*, 62*b* would collide with the column 58*a* in the position according to FIG. 2*c*. In FIG. 2*d*, the outer supports 62*a*, 62*b* are moved, in this case pivoted, out of the region of mutually aligned columns 58*a-d* (see FIG. 2*a*). Here, the outer supports 62*a*, 62*b* are each moved by a hydraulic drive 64*a*, 64*b*, which is not explicitly shown in FIG. 2*d*.

FIG. 2*e* shows the formwork device 10, which is positioned behind the inner mold 20 and the outer mold 22 (see FIG. 2*c*) relative to the advancing direction of the formwork device 10. In this case, the formwork device 10 comprises at least one concrete tube support, in this case two concrete tube supports 66*a*, 66*b*. The concrete tube support 66*a* and/or the concrete tube 66*b* support may comprise an outer roller 54*a*, in order to support the concrete tube 12. In FIG. 2*e*, only the outer roller 54*a* is visible. Preferably, the concrete tube supports 66*a*, 66*b* alternately comprise an outer roller 54*a* in the advancing direction.

According to FIG. 2*e*, the inner rollers 52*a*, 52*b*, 52*c*, 52*d* may be in the form of conical rollers or spherical rollers.

Figure 2G:
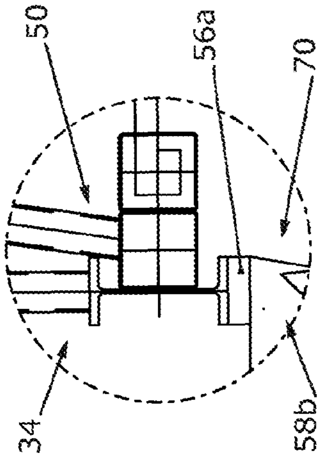
FIG. 2*g* is an enlarged partial view of the dashed region from FIG. 2*f*.
Figure 2F:
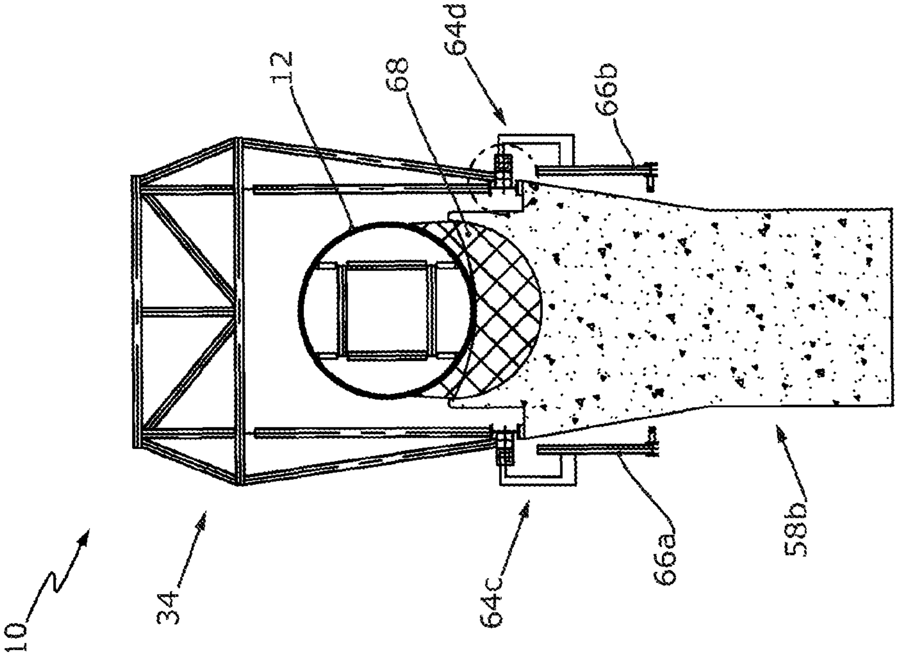
FIG. 2*f* is a view of the end face of part of the formwork device according to FIG. 2*e* in the region of a column.

Similarly to FIG. 2*d*, FIG. 2*f* shows the position of a portion of the formwork device 10 in the region of a column 58*b*. In order to prevent a collision with the column 58*b* when the formwork carriage 34 moves forward, the concrete tube supports 66*a*, 66*b* are pivoted away. Hydraulic drives 64*c*, 64*d*, which are not explicitly shown in FIG. 2*f*, are provided on the formwork carriage 34 for this purpose.

FIG. 2*f* also shows a bearing 68, which, in particular in the form of a poured concrete bearing, supports the concrete tube 12 on the column 58*b*. The bearing 68 is preferably produced after the portion of the concrete tube 12 is produced in the region of the bearing 68.

FIG. 2*g* shows a detail from FIG. 2*f*. FIG. 2*g* shows, by way of example, the supporting of the formwork carriage 34, in this case the outer supporting structure 50, on an outer shoulder 70 of the column 58*b*. It is supported here by a support roller 56*a*.

When considering all figures of the drawings together, the invention relates in summary to a method for producing a concrete tube 12 for a hyperloop passenger transport system. The concrete tube 12 is poured in place by means of a formwork device 10. The formwork device 10 comprises a formwork carriage 34, which moves forward while the concrete is being poured. The formwork carriage 34 has an inner mold 20 and an outer mold 22 for forming the concrete tube 12. A space 24 between the inner mold 20 and the outer mold 22 is filled with concrete 32, in particular continuously. The set concrete tube 12 can be supported on columns 58*a-d* by bearings 68. The freshly set portion of the concrete tube 12 is preferably supported on the inside by inner rollers 52*a-d* and on the outside by outer rollers 54*a*. The formwork device 10 may comprise support rollers 56*a*, 56*b* for supporting the formwork carriage 34 on the columns 58*a-d*. The invention further relates to the formwork device 10 for carrying out the method and to the concrete tube 12 produced using the method for the hyperloop passenger transport system.

The invention claimed is:

1. A formwork device for producing a horizontal concrete tube using a cast-in-place concrete construction, the formwork device comprising:

a formwork carriage that is horizontally movable on spaced-apart columns;

an outer mold and an inner mold that delimit a space, wherein concrete is introduced into the space via of a filling connection to form the concrete tube; and an end element for closing the space at an end, wherein the end element is positioned at an angle with respect to an upper part of the space and a lower part of the space such that there is difference in distance between the filling connection and a solidification front in the upper part and the lower part.

2. The formwork device according to claim 1, wherein the space is fillable from above the inner mold via the filling connection.

3. The formwork device according to claim 2, wherein the filling connection comprises a filling funnel.

4. The formwork device according to claim 2, wherein the filling connection is configured to fill both an upper part and a lower part of the space.

5. The formwork device according to claim 1, in which an angle of the end element can be adjusted relative to a longitudinal axis.

6. The formwork device according to claim 1, in which the inner mold has a cylindrical lateral outer surface and the outer mold has a cylindrical lateral inner surface, in order to produce the concrete tube with an annular or oval cross section.

7. The formwork device according to claim 1, in which the formwork carriage has an inner supporting structure to which the inner mold is fastened and has an outer supporting structure to which the outer mold is fastened.

8. The formwork device according to claim 7, in which the inner supporting structure comprises a truss assembly and/or the outer supporting structure comprises a truss assembly.

9. The formwork device according to claim 5, in which the inner supporting structure comprises an inner roller for being supported on the inside of the concrete tube and/or the outer supporting structure comprises an outer roller for being supported on the outside of the concrete tube.

10. The formwork device according to claim 7, in which the formwork device comprises a support roller, by means of which the formwork carriage can be supported on one of the columns.

11. The formwork device according to claim 1, in which the formwork device comprises an outer support for supporting the outer mold, the outer support being movable in order to be able to pass by one of the columns when the formwork carriage advances horizontally.

12. The formwork device according to claim 11, wherein the outer support is hydraulically movable.

13. The formwork device according to claim 1, in which the formwork device comprises a concrete tube support for supporting the concrete tube, the concrete tube support being movable in order to be able to pass by one of the columns.

14. The formwork device according to claim 13, wherein the concrete tube support is hydraulically movable.

15. The formwork device according to claim 1, in which the formwork device comprises a drive in order to move the formwork carriage horizontally forward when pouring concrete.

16. The formwork device according to claim 15, wherein the drive comprises an advancing hydraulic cylinder.

17. The formwork system according to claim 1, wherein the angle is adjustable to control the difference in distance between the filling connection and the solidification fronts.

18. The formwork device according to claim 1, further comprising an inner supporting structure configured to support the inner mold and an outer supporting structure configured to support the outer mold.

19. A formwork system, comprising:

the formwork device according to claim 1; and spaced-apart columns on which the formwork carriage is movable.

* * * * *